Sept. 6, 1966 K. SCHMALZ 3,270,551
ARTICLE TESTING DEVICES
Filed April 7, 1964 5 Sheets-Sheet 5
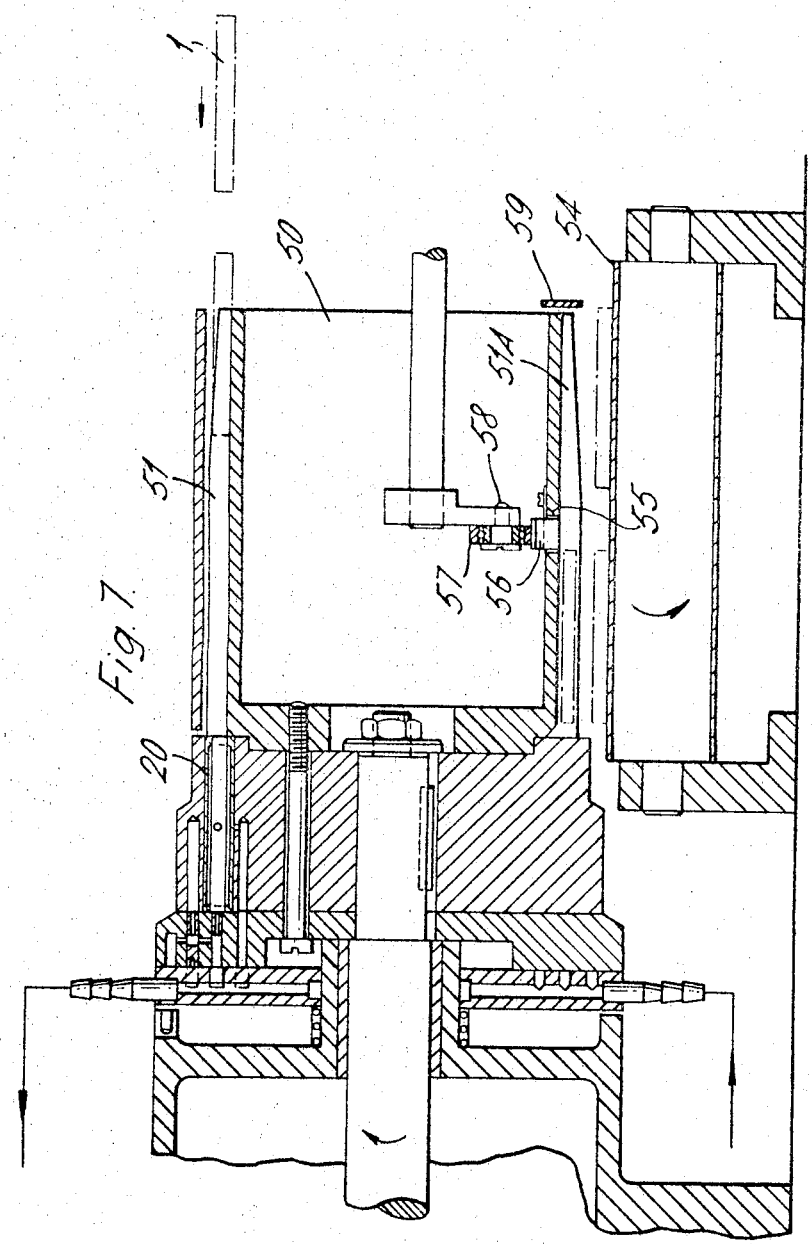
INVENTOR
Konrad Schmalz
BY Watson, Cole, Grindle & Watson
ATTORNEYS United States Patent Office 3,270,551
Patented Sept. 6, 1966

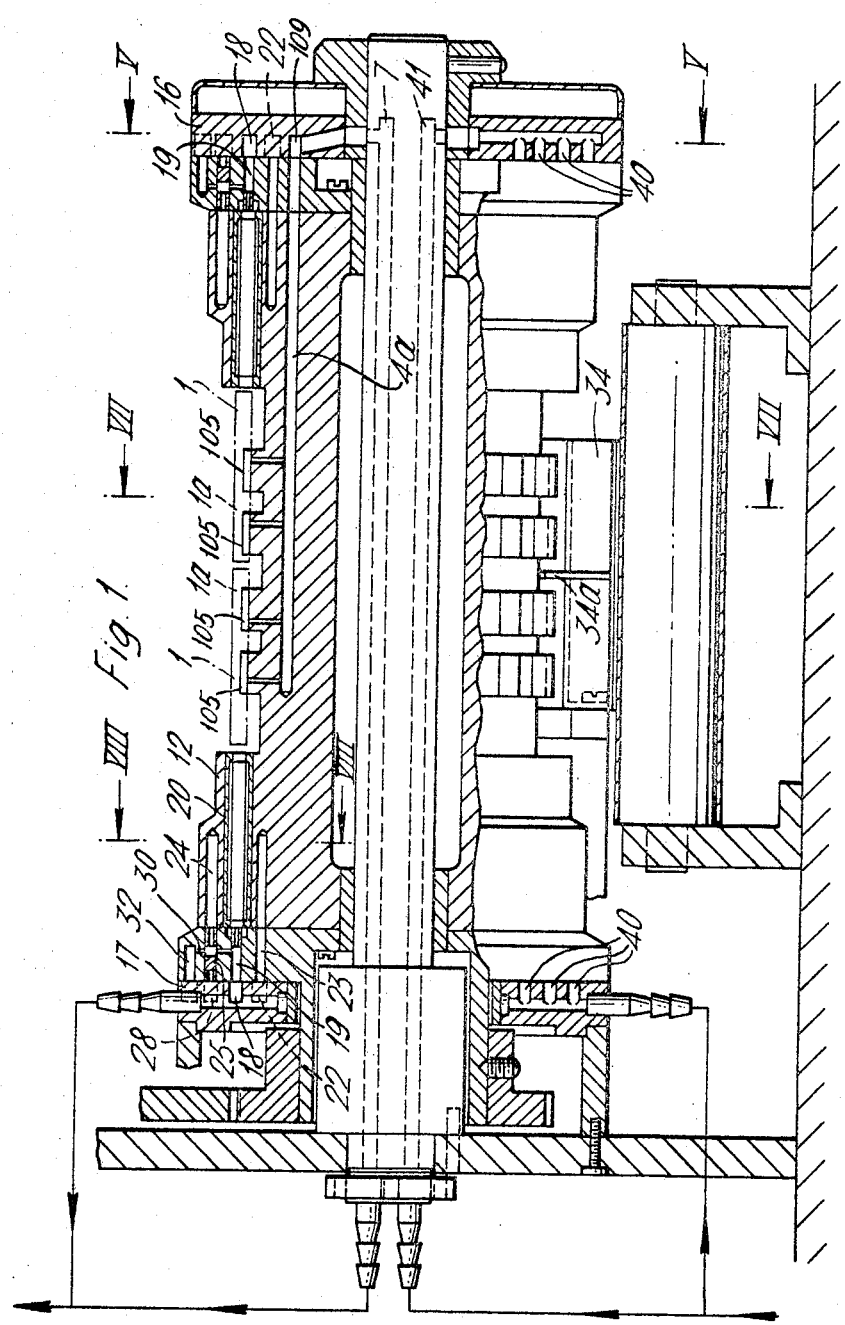

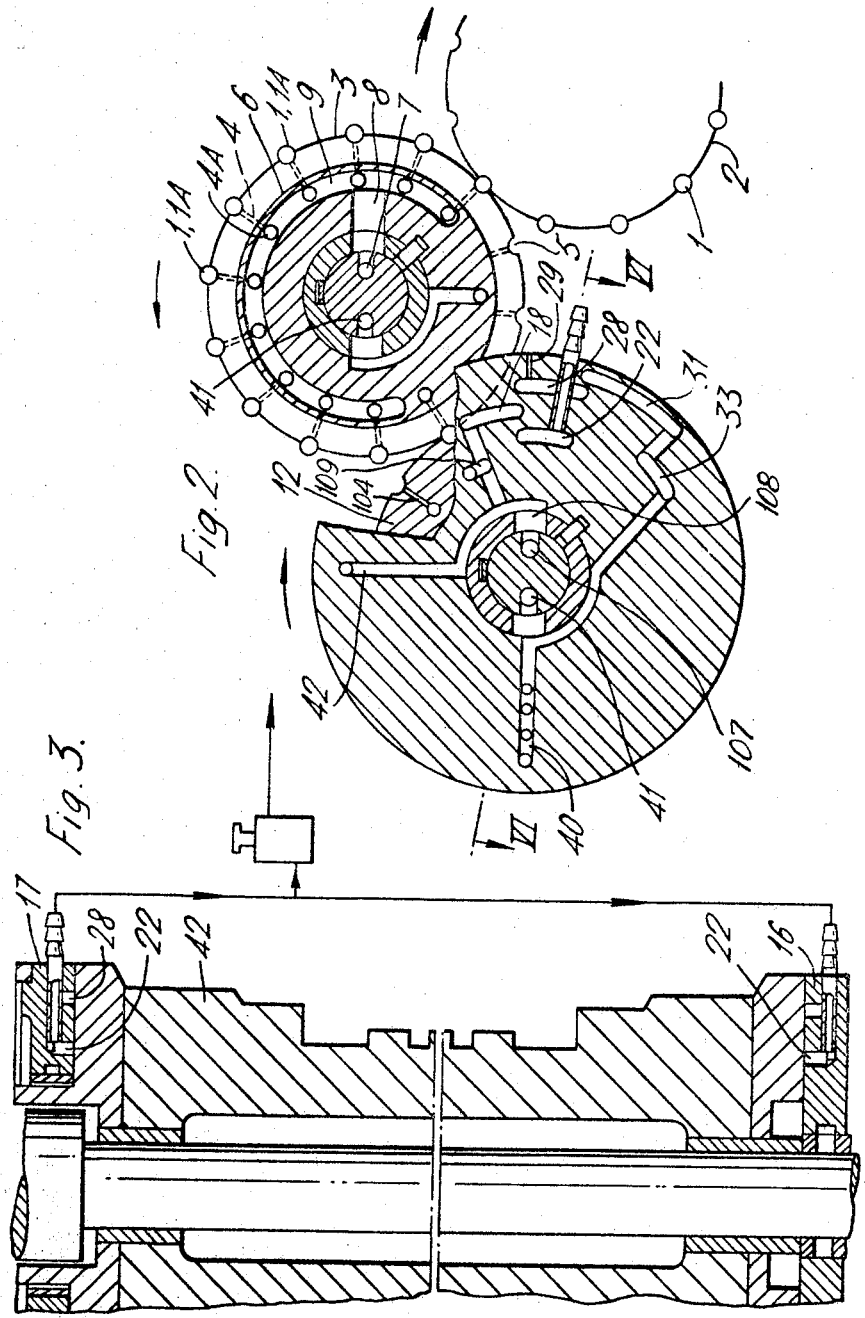

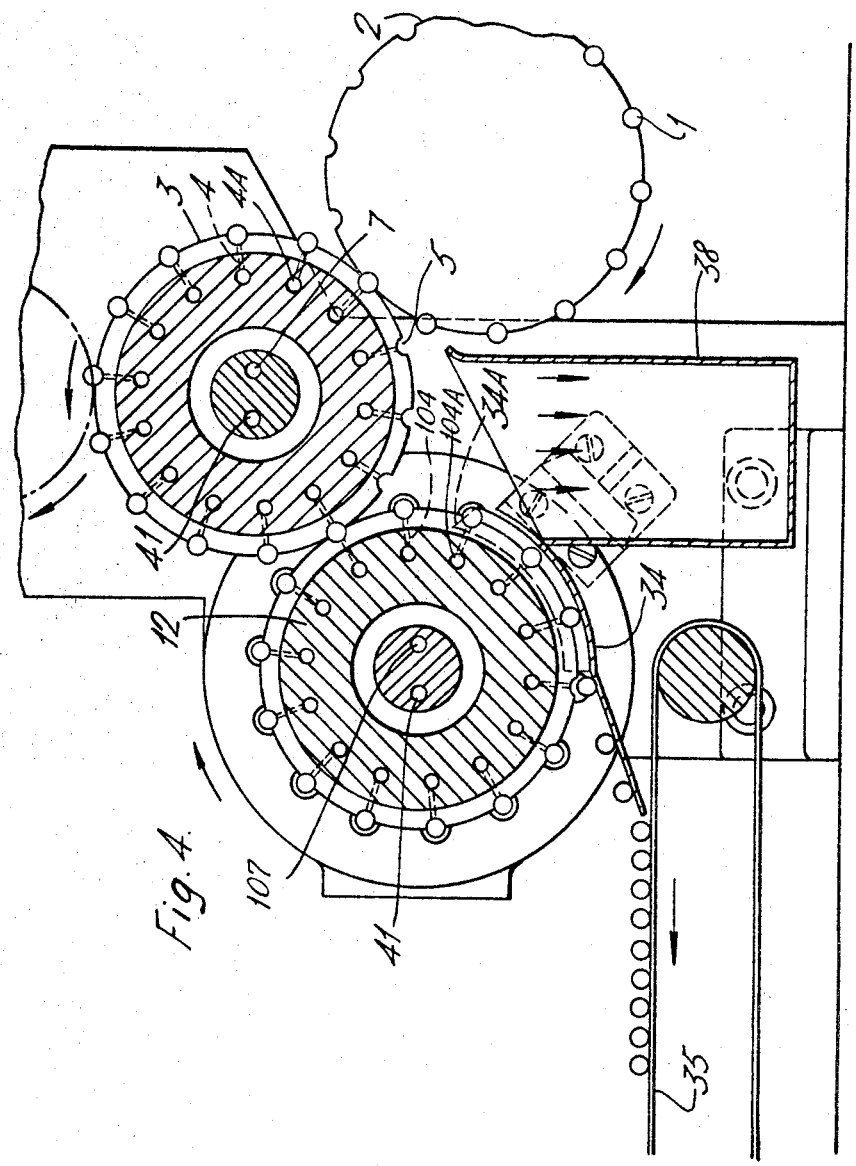

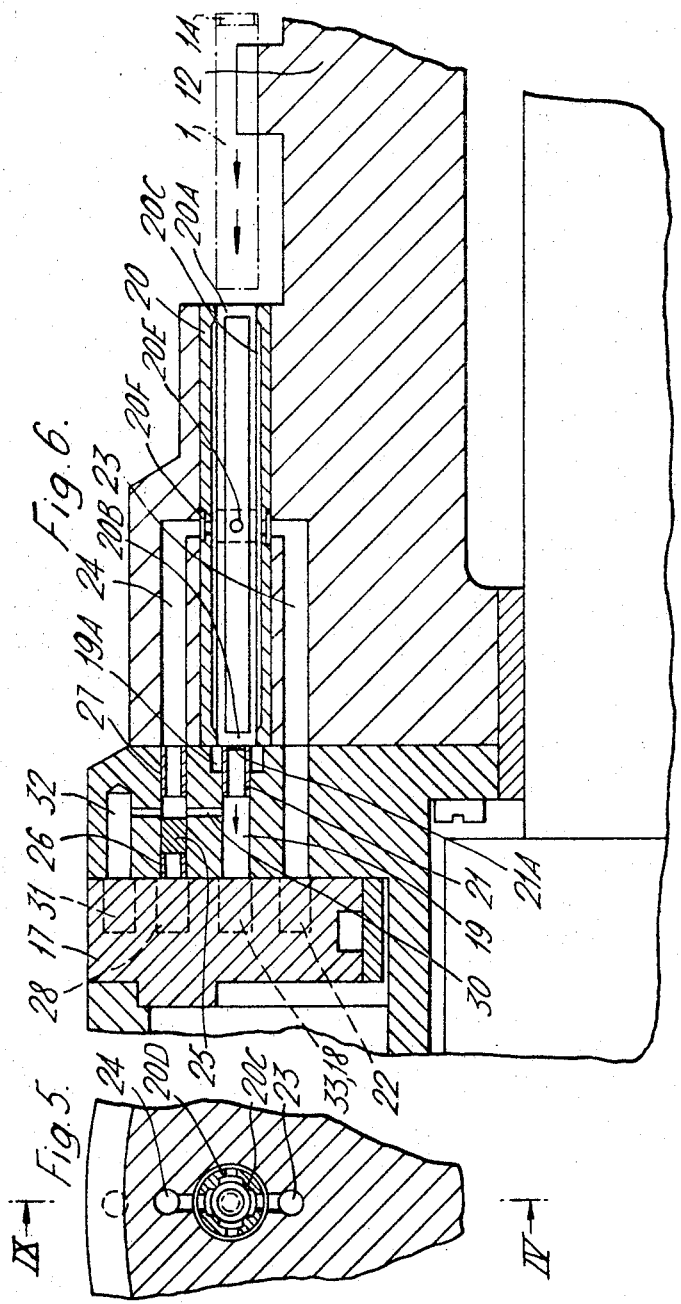

3,270,551
ARTICLE TESTING DEVICES
Konrad Schmalz, Bremen-Hemelingen, Germany
Filed Apr. 7, 1964, Ser. No. 357,908
Claims priority, application Great Britain, Apr. 9, 1963,
14,117/63
8 Claims. (Cl. 73—38)

This invention relates to devices for testing articles of the type having a substantially air-impervious wrapper of generally tubular form enclosing an air-pervious filler. A good example of such an article is a cigarette, and for convenience of language the following description will refer to cigarettes although it should be understood that the application of the invention is not limited thereto.

Various proposals have been made for the testing of cigarettes to verify that the paper wrapper has no leaks, e.g. due to bad pasting of the seam, or faulty attachment of a filter tip when one it fitted, because the presence of any leak in the wrapper makes it difficult or impossible for the cigarette to be smoked. Such proposals have in general been directed to the creation of different air pressures within the filler and around the outside of the wrapper, and detection of any resulting air flow which must indicate leakage through the wrapper. Is has also been recognized as desirable to check the firmness of the filler itself. However, all proposed methods of, and devices for, testing cigarettes have to be operable at quite high speed, to match the speed of machines which actually manufacture the cigarettes which can be as high as 2,000 cigarettes per minute.

It is an object of the present invention to provide a device for testing articles of the type defined, which tests at least for the presence of leaks in the wrapper and is capable of operation at relatively high speeds.

According to the invention, there is provided a device for testing articles, such as cigarettes, having a substantially air-impervious wrapper of generally tubular form enclosing an air-pervious filler, comprising a testing chamber having an open end, means for bringing an article to be tested to a loading position in alignment with said chamber and adjacent said open end thereof, and means for applying suction to said chamber so that atmospheric pressure urges any article at the loading position into said chamber.

Preferably said testing chamber has restricted end portions so shaped that when an article of correct size is placed in said chamber, the wrapper engages the walls of said chamber adjacent the ends of the article, said chamber being of greater cross-section between said end portions so that an annular space surrounds the article, and the suction means being connected to said space. It is possible, and preferred, in this arrangement for the end of the chamber remote from the open end to be closed and to include a stop member of smaller cross-section than an article of correct size, surrounded by an annular recess. A cigarette or other article having a filler of proper firmness will, on entry into the chamber, stop when its end engages the stop member and its ends will then be within the restricted end portions of the chamber. If however the filler is insufficiently firm, then the cigarette or other article will enter the chamber further, the stop member becoming to some extent embedded in the filler, and the other end of the article will pass the restricted end portion of the chamber so that the annular space has communication with the open end, as would be provided by a leak in the wrapper.

The said stop member may conveniently be connected to means for delivering compressed air to eject an article from said chamber. Outside the open end of said chamber, and in alignment therewith there may be a trough accommodate articles immediately before entering and after leaving said chamber.

It is also preferred that the device shall include detecting means arranged to cause ejection of an article from said chamber upon detection of air flow through the wrapper thereof. Such detecting means may include a pressure-responsive valve having one side exposed to variable air pressure in the annular space and the other side exposed to an atmospheric pressure, said valve being arranged to move to an operated position whenever said variable air pressure is less than atmospheric pressure by at least a selected difference but to remain in or return to a normal position at other times; in its normal and operated positions respectively said valve is arranged to open and close a passage for delivering compressed air to eject the articles from said chamber.

In operation of a device embodying the invention, and having the several preferred features set out above, whenever an article, say a cigarette, for testing is placed in the trough, it is at the leading position and is urged into the chamber. The engagement of the wrapper, at each end of the cigarette, with the chamber walls in the restricted end portions seals off the annular space around the cigarette from the atmosphere and the air pressure in said space falls under the influence of the suction means. Provided the wrapper has no leaks, this variable pressure in the chamber rapidly approaches the lowest value produced by the suction means, and the pressure-operated valve moves to its operated position. At a later time, compressed air is admitted to the closed end of the chamber to eject the cigarette. If however the cigarette wrapper leaks, then the pressure in the annular space does not fall sufficiently below atmospheric pressure to operate the valve, which accordingly allows compressed air to reach the chamber and eject the cigarette shortly after its arrival in the chamber.

Such a device requires to be provided with means for directing cigarettes to one destination if ejected shortly after entry into the chamber and another destination if they remain in the chamber longer i.e. to separate leaky and good cigarettes respectively. This means may take various forms but it is preferred to provide in the device a plurality of said chambers symmetrically disposed on a rotatable member mounted adjacent to a stationary member and having a valve face in air-tight engagement with a cooperating face of said stationary member. The said faces respectively contain ports providing suction and compressed air connections for each of the chambers, and supply ports connected with common suction and compressed air supply means, the whole arrangement of said ports being such that each chamber is connected to the respective supply means as that chamber reaches predetermined positions in consequence of rotation of said rotatable member.

With such a multiple-chamber device, it will be appreciated that a leaky cigarette ejected from any chamber shortly after entry therein will emerge from the chamber when the rotatable member has turned only a short distance from the position it occupied when the cigarette entered the chamber. A good cigarette, however, emerges later, and the rotatable member will have turned farther. Thus leaky and good cigarettes will be ejected from the chambers at different positions and may readily be collected by different conveyors or other collecting means.

In order that the invention may be well understood, a preferred embodiment thereof will now be described, reference being made to the accompanying drawings in which:

FIGURE 1 is a view, partly sectional of a device embodying the invention for use in testing filter-tipped cigarettes;

FIGURE 2 is a sectional view on line V—V of FIGURE 1;

FIGURE 3 is a sectional view on line VI—VI of FIGURE 2;

FIGURE 4 is a sectional view on line VII—VII of FIGURE 1;

FIGURE 5 is a sectional view on line VIII—VIII of FIGURE 1, on a larger scale;

FIGURE 6 is a sectional view on line IX—IX of FIGURE 5, again on a larger scale, and FIGURE 7 is a sectional view through a delivery drum of a cigarette-making machine fitted with a testing device embodying the invention.

First considering the device of FIGURES 1 to 6, cigarettes 1 are delivered by a cutting drum 2 (FIGURES 2 and 4) of a filter-tip attaching machine to a transfer drum 3. The drum 3 is of the type often termed a suction drum, in that it has air holes 4 through which suction is applied so that the cigarettes are held against the surface of the drum by atmospheric pressure. The surface of drum 3 is formed with troughs or flutes 5 parallel to its axis, and the air holes 4 for each trough 5 connect with a common passage 4a. The several passages 4a extend to one end of the drum 3 to provide ports in the end face of the drum, which makes airtight engagement with a face of a stationary control ring 6. Suction is applied to passages 4a from a vacuum pump (not shown) via a conduit 7, passage 8, and an elongated port 9 in the face of ring 6 which engages the drum 3. The disposition of port 9 is such that, in each rotation of drum 3, each passage 4a is in communication with the port 9 from the point at which the associated trough is adjacent the drum until that trough 5 has almost reached the point at which cigarettes carried in that trough are to be released for transfer to a testing drum 12. Each trough 5 carries two cigarettes, lying in end-to-end relation, from drum 2 to drum 12.

The drum 12 is longer than drum 3, having end portions overlapping both ends of the latter. Between said end portions, the drum 12 has troughs 105 similar to those of the drum 3, and similarly formed as a suction drum, i.e. having air holes 104, common passages 104a, a conduit 107 connected to a vacuum pump (not shown) and a passage 108 leading to a port 109 in a control ring 16. The ring 16 corresponds to, but is more complex in form than, the ring 6 as will be explained.

The end portions of the drum 12 each have a testing chamber 20 in alignment with each of the troughs 105 extending between said end portions. In FIGURE 1, it will be seen that at the left-hand end a control ring 17 corresponds to control ring 16 at the right-hand end. Each chamber 20 has one open end, adjacent the associated trough 105, and at the other end a drilling 19 extends to the end face of the drum and provides a port therein with which a port 18 in the ring 16 or 17 connects at appropriate stages in the rotation of the drum (see FIGURE 2). The port 18 communicates with passage 108 and hence, when port 18 and the port formed by the end of drilling 19 are in alignment, the chamber 20 has suction applied to it so as to produce air flow into its open end and along its length.

From FIGURE 2, it will be seen that as each trough 105 (and its associated chambers 20) comes nearest to the drum 3, it will come into alignment with a trough 5 of drum 3 and also suction will reach air holes 104 of the trough 105 on drum 12 via port 109 and cigarettes in the aligned trough of the drum 3 will be retained on drum 12 as rotation of the two drums continues (suction to the holes 4 of trough 5 on drum 3 having ceased shortly before as noted previously). Shortly after the trough 105 of drum 12 now accommodating a pair of cigarettes in end-to-end relation has moved away from the drum 3, suction to the air holes 104 of that trough ceases and suction begins through the associated chambers 20, via drillings 19. As the ends of cigarettes 1, 1a are close to the open ends of the left and right-hand chambers 20 (FIGURE 1) the cigarettes enter chambers 20 until they engage stops 21 at the far end of said chambers. Each stop 21 comprises a short tubular insert in the mouth of drilling 19, and around approximately half the length of such insert the drilling 19 is enlarged to provide an annular recess 19a around said insert and adjoining the chamber 20. At the end adjoining said chamber, said insert has a wire gauze endpiece 21a which permits air to pass between the chamber 20 and the drilling 19 but prevents the passage of solid bodies of any substantial size.

The interior of each chamber 20 is of length to receive a correctly-sized cigarette and its end portions 20a, 20b are restricted as compared with the majority of its length; the said end portions 20a, 20b are of such diameter as to fit closely to a correctly-sized cigarette; thus when a cigarette is within the chamber, most of its length is surrounded by an annular space but that space is isolated from the outer air and from the drilling 19 by the contact of end portions of the cigarette wrapper with the walls of the chamber in the restricted portions 20a, 20b respectively.

It should be noted that while the majority of the length of the cigarette is, for functional purposes, surrounded by an annular space, because during testing the wrapper will be subjected to an internal pressure higher than that in said space, ribs 20c are formed longitudinally of the chamber walls to provide support for the wrapper and guide cigarettes on entry to and exit from the chamber 20. Thus the annular space is in fact broken up into several sections 20d which are interconnected by holes 20e through the chamber walls and an annular passage 20f (see FIGURES 5 and 6) outside said walls.

The passage 20f communicates with a passage 23 leading to a port in the end face of drum 12 which, as rotation of drum 12 brings drilling 19 out of register with port 18, comes into register with a port 22 in ring 16 or 17; through port 22 suction is applied to the annular space formed, for practical purposes, by sections 20d; at the same time the ambient air is applied via a port 28 to one side of a piston valve 25, the other side of valve 25 being exposed to the pressure in annular passage 20f, via a duct 24. When the applied suction produces a lower pressure than atmospheric in passage 20f, valve 25 moves from a normal position as shown in FIGURE 6, against a seating 26 in the left-hand end of a cylinder in which it operates, to seat at 27, in the right-hand end of its bore, this being its operated position, and in this position the valve 25 closes a passage 30 extending from drilling 19 to a port 32 (in drum 12) cooperating with port 31 in the ring 16 or 17. The valve 25 is so arranged that a pressure difference sufficient to move it to its operated position is not produced unless the cigarette wrapper has no leaks.

As drum 12 rotates further, port 32 comes into register with port 31 which latter port is connected to a source of compressed air (not shown). At this stage, if valve 25 is in its operated position, i.e. if the cigarette in chamber 20 is not leaky, the compressed air reaching passage 30 cannot reach drilling 19 and is ineffective; if however the cigarette is leaky, valve 25 will be in its normal position and the compressed air will reach drilling 19 and cause ejection of the cigarette from the chamber 20.

At this stage, it should be noted that while a leaky cigarette will be ejected in the manner just described, a non-leaky cigarette will also be ejected if its end is insufficiently packed with tobacco. This occurs because, on entry of the cigarette into chamber 20, it should stop when its leading end strikes stop 21, but if this end is loosely packed, the cigarette will travel further as the impact against stop 21 will impale the cigarette on the stop to some extent, the wrapper being received in recess 19a. If the looseness of the end is more than can be tolerated, the extra movement of the cigarette will be sufficient to allow its trailing end to move so far into the chamber 20 as to pass the restricted end portion 20a completely and the trailing end then cannot make an effective seal with the chamber walls, hence there is a leak past the end of the cigarette, which is therefore treated as leaky. Wire gauze 21a prevents tobacco particles from such a cigarette being drawn into the vacuum pump.

When ejection takes place as compressed air passes valve 25 in its normal position, it will be appreciated that the cigarette will be at a position circumferentially of the drum 12 corresponding to the leading end of port 31, i.e. at about a "four o'clock" position as seen in FIGURE 2, and thus it falls into a reject bin 38 (FIGURE 4). If the cigarette is not leaky, however, and valve 25 is operated, ejection at this position does not occur, but the cigarette remains in chamber 20 until the drum 12 has rotated to bring the cigarette to about the "five o'clock" position (FIGURE 2). At this stage, the port provided by drilling 19 comes into register with a port 33 in the ring 16 or 17; port 33 is also supplied with compressed air, which effects ejection of the cigarette on to a guide plate 34 down which the cigarette rolls to a conveyor belt 35.

The rings 16, 17 each have a line of ports 40 with which the passages 19, 23, 24 and 32 of each chamber 20 come into alignment as the drum brings that chamber to the "nine o'clock" position (FIGURE 2); ports 40 are all connected to a compressed air supply duct 41, which also supplies ports 31, 33 previously mentioned. Thus the various passages associated with each chamber 20 are blown through between ejection of each cigarette and arrival of the next, so that the operations described are not affected by stray dust, tobacco particles or other foreign bodies. After this blowing through, as each chamber 20 comes to to "twelve o'clock" position its associated passage 24 comes into alignment with a port 42 in ring 16 or 17; port 42 is connected to passage 108 and hence suction is applied at this stage, which serves to ensure that valve 25 is in its normal position before the next cigarette arrives in chamber 20.

The device described above, and illustrated in FIGURES 1–6, is particularly suitable for testing cigarettes fitted with filter tips. In FIGURE 7 is shown a device embodying the invention which is suitable for incorporation in a machine for making untipped cigarettes.

Referring to FIGURE 7, the device shown has a testing drum carrying a plurality of chambers 20 and generally similar to the drum 12 of FIGURES 1–6; the several ports of this drum will therefore not be described in detail. However, in this form of device the testing drum is associated with a drum 50 constituting a known form of delivery drum of the cigarette making machine, which drum 50 has troughs or flutes 51 into which newly-made cigarettes are delivered one at a time; each cigarette enters a trough 51 from the right, as seen in FIGURE 7, with sufficient momentum to travel fully into the trough 51. As each cigarette is about to come to rest adjacent the open end of chamber 20, suction applied through said chamber as above described causes the cigarette to enter the chamber and testing proceeds as in the device of FIGURES 1–6.

The drum 50 is arranged to deliver good cigarettes on to a belt conveyor 54 in two rows. For this purpose alternate troughs 51 (the trough 51a shown at the lowest part of the drum 50) have an aperture 55 half-way along their length, and a stop 56 normally accommodated in the opening 55 is caused to protrude as the associated trough reaches the position at which a good cigarette is ejected from chamber 20, so that such cigarette is stopped half-way along the trough and drops on to the left-hand part of the conveyor 54. In the troughs without openings 55, cigarettes emerging from chamber 20 travel the full length of the trough, encounter a fixed stop 59, and fall on to the right-hand part of conveyor 54.

Each stop 56 is spring-loaded to its normal (retracted) position and at the appropriate stage in rotation of drum 50 is caused to protrude by engagement with a roller 57 carried on a fixed shaft 58.

As before, leaky cigarettes will be ejected from the chamber 20 at an earlier stage in the rotation of the drum; at this earlier stage, the ejected cigarette will not encounter any stop 56 as it passes along trough 51, even if the trough be fitted with such stop, as the stop will still be retracted. Also the trough will not have come into register with fixed stop 59, hence the ejected cigarette will travel the full length of the trough and fall to the right of conveyor 54, where a reject bin (not shown) may be placed.

I claim:

1. A device for testing articles, such as cigarettes, having a substantially air-impervious wrapper of generally tubular form enclosing an air-pervious filler, comprising a testing chamber having an open end, means for bringing an article to be tested to a loading position in alignment with said chamber and adjacent said open end thereof, and means for applying suction to said chamber so that atmospheric pressure urges any article at the loading position into said chamber, said testing chamber having restricted end portions so shaped that when an article of correct size is placed in said chamber, the wrapper engages the walls of said chamber adjacent the ends of the article, said chamber being of greater cross-section between said end portions so that an annular space surrounds the article, the suction means being connected to said space.

2. A device as claimed in claim 1, in which the end of the chamber remote from the open end is closed and includes a stop member of smaller cross-section than an article of correct size, surrounded by an annular recess.

3. A device as claimed in claim 2, in which said stop member is hollow and connected to means for delivering compressed air to eject an article from said chamber.

4. A device as claimed in claim 1, including ribs on the walls of said chamber engageable with a cigarette therein and passages interconnecting the spaces between said ribs.

5. A device as claimed in claim 1, in which a trough is provided outside and in alignment with the open end of said chamber to accommodate articles immediately before entering and after leaving said chamber.

6. A device as claimed in claim 1, including detecting means arranged to cause ejection of an article from said chamber upon detection of air flow through the wrapper thereof.

7. A device as claimed in claim 1, including means for detecting air flow through the wrapper of an article in said chamber, in which the detecting means comprises a pressure-responsive valve having one side exposed to variable air pressure in the annular space and the other side exposed to atmospheric pressure, said valve being arranged to move to an operated position whenever said variable air pressure is less than atmospheric pressure by at least a selected difference and to maintain a normal position at other times, said valve in its normal and operated positions respectively being arranged to open and close a passage for delivering compressed air to eject the article from said chamber.

8. A device as claimed in claim 1, including a plurality of said chambers symmetrically disposed upon a rotatable member mounted adjacent to a stationary member and having a valve face in air-tight engagement with a cooperating face of said stationary member, said valve face containing ports providing suction and compressed air connections for each of said chambers and said cooperating face containing supply ports connected with common suction and compressed air supply means, the whole arrangement of said ports being such that each chamber is connected to the respective supply means as that chamber reaches predetermined positions in consequence of rotation of said rotatable member.

References Cited by the Examiner

UNITED STATES PATENTS 2,013,402  9/1935  Cameron _____ 73—45.2
2,059,038  10/1936  Sala _____ 73—38 X

FOREIGN PATENTS 1,113,658  9/1961  Germany.

LOUIS R. PRINCE, *Primary Examiner.*
F. H. THOMSON, *Assistant Examiner.*